E. G. SMITH.
CONDUIT OUTLET BOX AND FIXTURE THEREFOR.
APPLICATION FILED AUG. 7, 1911.
1,201,771. Patented Oct. 17, 1916.
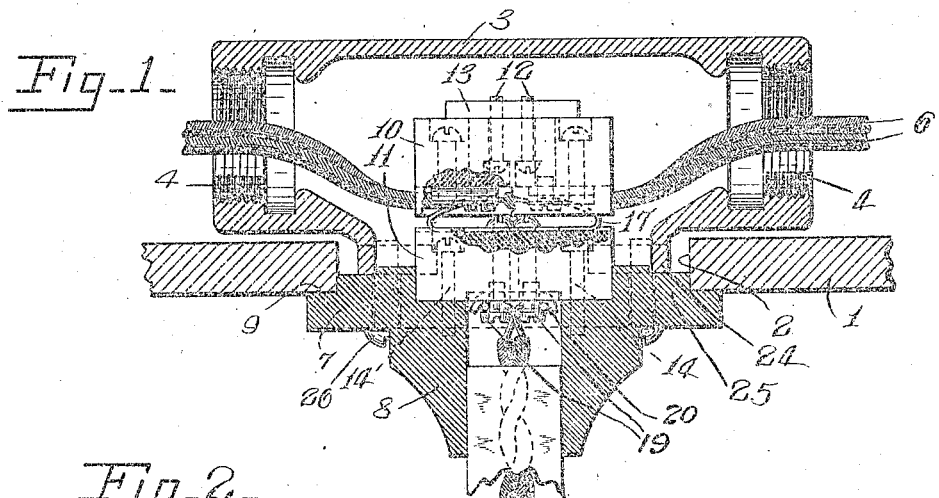
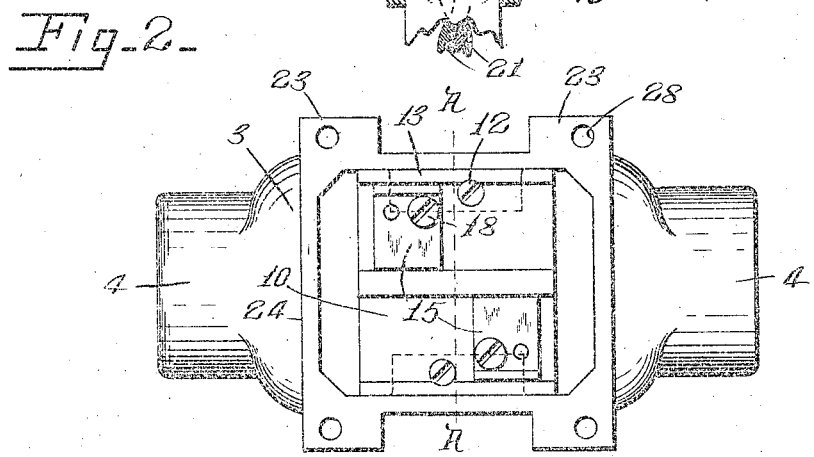
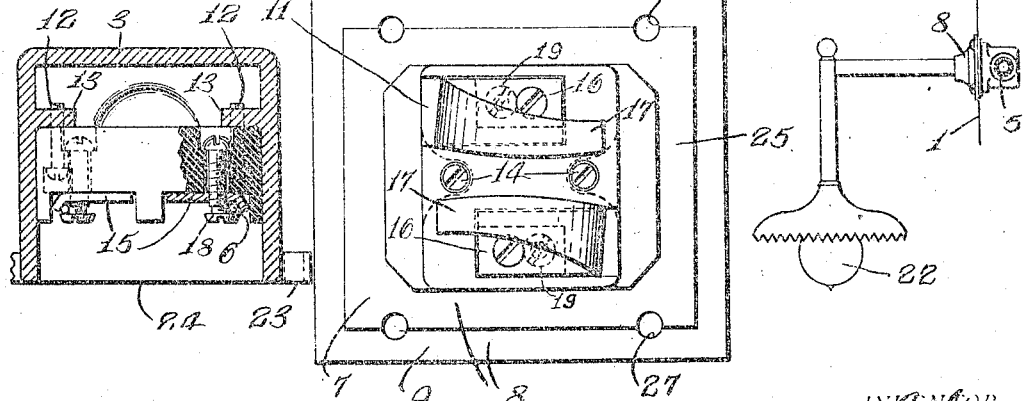
WITNESSES:
INVENTOR.
Elda G. Smith
BY Parsons Max Bodell
ATTORNEYS

UNITED STATES PATENT OFFICE.

ELDA G. SMITH, OF SYRACUSE, NEW YORK, ASSIGNOR TO CROUSE-HINDS COMPANY, OF SYRACUSE, NEW YORK, A CORPORATION OF NEW YORK.

CONDUIT OUTLET-BOX AND FIXTURE THEREFOR.

1,201,771.  Specification of Letters Patent. Patented Oct. 17, 1916.

Application filed August 7, 1911. Serial No. 642,780.

*To all whom it may concern:*

Be it known that I, ELDA G. SMITH, of Syracuse, in the county of Onondaga and State of New York, have invented a new and useful Conduit Outlet-Box and Fixture Therefor, of which the following is a specification.

This invention has for its object the production of a conduit outlet box and fixture therefor, particularly applicable for use in railway cars for supporting electric lamps; and it consists in the combinations and constructions hereinafter set forth and claimed.

In describing this invention reference is had to the accompanying drawing in which like characters designate corresponding parts in all the views.

Figure 1 is a longitudinal sectional view of a preferable form of my invention, the supporting wall being also shown. Fig. 2 is a plan of the outlet box and parts therein. Fig. 3 is an inverted plan of the fixture and parts carried thereby. Fig. 4 is a sectional view on line A—A, Fig. 2. Fig. 5 is a detail view partly in section illustrating one use of my invention.

1 is the inner wall of a car body or other structure having a double wall, the wall 1 having an opening 2 therein. 3 is a conduit outlet box, preferably oblong in form, and located on the inner side of the wall 1 and having means as one or more internally threaded nipples 4 for connection with an electrical conduit 5, Fig. 5, which incloses the line wires 6, and also having a non-circular opening in one side thereof in register with the opening 2. The box is supported by said conduits for the wires 6 which conduits are secured in any suitable manner to the car body.

7 is the base of a fixture 8, the base being arranged on the outer side of the wall 1 and serving as a closure for the opening 2 and for the opening in the contiguous side of the box 3, the base having a flange 9 lapping the outer face of the wall 1. The box 3 and the base 7 are secured together by clamping means to be presently described.

10 and 11 are, respectively, blocks forming the base and cap of an electrical appliance, the block 10 being located in the box 3 and detachably secured by screws 12 to flanges 13 projecting into the box from opposite side walls thereof as seen in Fig. 4. The block 11 is detachably secured to the base 7 of the fixture 8 in any suitable manner as by screws 14.

The blocks 10 and 11 are provided, respectively, with terminals 15, 16 mounted on their opposing faces, and the terminals are connected by spring conductors or contact terminals 17 carried by one of the blocks 10, 11 as the block 11, said spring means 17 being illustrated as fixed to the terminals 16 and having yielding free ends detachably engaging the terminals 15.

The terminals 15 are connected by suitable binding screws 18 to the stripped portions or ends of the line wires 6, and the terminals 16 are connected by the conducting screws 19 and binding devices 20, to wires 21 passing through the fixture 8 to the lamp or other appliance 22, Fig. 5.

In the illustrated embodiment of my invention the box 3 is shown as formed with laterally extending ears or flanges 23 and with an outwardly extending lip or flange 24 around the opening of the box, this flange 24 extending into the opening 2 of the wall, and preferably terminating between the ends of the opening 2 and forming a facing for the edge of such wall 1 around the opening 2. As seen in Fig. 4 portions of the flange 24 are extensions of the long sides of the box and the ears 23 project from the flange 24.

The base 7 of the fixture is preferably provided with a non-circular portion 25 rising above the face of the flange 9 engaging the wall 1 and extending into the opening of the wall 1 and having opposite substantially parallel sides engaging opposite sides of the opening 2, and when the parts are in their normal position, said portion 25 abuts against the edge of the facing flange 24. Preferably the upper end of the projection 25 is reduced in size and is formed with opposite substantially parallel sides engaging opposite sides of the opening in the outlet box.

The box 3 and base 7 of the fixture are clamped toward each other by any suitable means as screws 26 passing through openings 27 in the flange 9 of the base 7 through the opening 2 of the wall 1 and into the threaded openings 28 of the ears 23, the spring conductors 17 compressing during the clamping action of the screws 26.

In operation the conduit work including the box 3 is built into the walls of the car and the fixtures can be readily attached or detached therefrom and when in position present a neat and pleasing appearance to the eye.

What I claim is:

1. The combination with a wall having an opening therein, of a conduit outlet box on the inner side of the wall having means for connection with an electric conduit and an opening in one side thereof for registering with the opening in the wall, a fixture on the outer side of the wall including a base serving as a closure for the first-mentioned opening, an electrical appliance including a base detachably fixed within the box, a cap carried by the first-mentioned base and separable from the base of the electrical appliance, terminals on the opposing faces of the base and the cap of the electrical appliance, and yielding means for detachably connecting the terminals when the first mentioned base is in its normal position, and clamping means for effecting relative movement of the fixture and the box toward said wall, substantially as and for the purpose set forth.

2. The combination with a wall having an opening therein; of a conduit outlet box on the inner side of the wall having means for connection with an electric conduit, and an opening in one side thereof for registering with the opening in the wall, a fixture on the outer side of the wall including a base serving as a closure for said openings and having a flange lapping the outer face of said wall, an electrical appliance including parts carried respectively within the box and by the base of the fixture and having terminals electrically connected through said openings, and means for clamping the box and fixture toward each other, said means being movable relatively to the fixture and the outlet box, substantially as and for the purpose described.

3. The combination with a wall having an opening therein, of a conduit outlet box on the inner side of the wall having means for connection with an electric conduit, and an opening in one side thereof for registering with the opening in the wall, the box being also formed with a flange extending around the opening thereof and projecting into the opening of the wall and constituting a facing for the edge of the wall around the opening in said wall, a fixture on the outer side of the wall including a base coacting with the edge of said flange and serving as a closure for said opening and having a flange lapping the outer face of said wall, an electrical appliance including parts carried respectively within the box and by the base of the fixture and having terminals electrically connected through said openings, and means for clamping the base of the fixture and the box toward each other, said means being movable relatively to the fixture and the outlet box, substantially as and for the purpose described.

4. The combination with a wall having an opening therein; of a conduit outlet box on the inner side of the wall having means for connection with an electric conduit, and an opening in one side thereof for registering with the opening in the wall, the side provided with the opening being also formed with an outwardly extending flange around the opening of the box, the flange extending into the opening in the wall and constituting a facing for the edge of the wall around the opening in said wall, a fixture on the outer side of the wall including a base having a portion engaging the edge of the wall around the first-mentioned opening and resting on the flange said base also having a marginal flange lapping the outer face of the wall, an electrical appliance including parts carried respectively within the box and by the base of the fixture and having terminals electrically connected through said openings, and means for clamping the base of the fixture and the box together, said means being movable relatively to the fixture and the outlet box, substantially as and for the purpose set forth.

5. The combination with a wall having an opening therein; of a conduit outlet box on the inner side of the wall having means for connection with an electric conduit, and an opening in one side thereof for registering with the opening in the wall, a fixture on the outer side of the wall including a base serving as a closure for said openings and having a flange lapping the outer face of said wall, an electrical appliance including a base located in the box and connected to the wires therein, a cap carried by the fixture, the base and cap of the appliance being formed with terminals on their opposing faces, and spring conductors carried by one of the parts of the appliance and connected to the terminals thereof for yieldingly contacting with the terminals of the other of said parts of the appliance, and means for clamping the box and the fixture toward each other, said means being movable relatively to the fixture and the outlet box, substantially as and for the purpose set forth.

6. The combination with a wall having an opening therein; of a conduit outlet box on the inner side of the wall having means for connection with an electric conduit, and an opening in one side thereof for registering with the opening in the wall, the box also having a flange around the opening therein and extending into the opening of the wall and constituting a facing for the edge of the wall around the opening in said wall, a fixture on the outer side of the wall including a base having a flange lapping the outer face of said wall, and a portion extending into the opening of the wall and bearing against the facing, an electrical appliance including a base fixed within the box and having terminals for connection with the wires in the box, a cap carried by the fixture, the base and the cap of the electrical appliance having terminals on their opposing faces, and spring conductors carried by one of the parts of the appliance and connected to the terminals thereof and yieldingly engaging the terminals of the other of said parts, and means for clamping the fixture and the box toward each other, said means being movable relatively to the fixture and the outlet box, substantially as, and for the purpose specified.

7. The combination of a conduit outlet box having means for connection with an electric conduit, and an opening in one side thereof for registering with the opening in a supporting wall, the box having a flange around the opening therein, the flange being adapted to extend into the opening of the supporting wall, a fixture including a base having means for resting on the edge of the flange and adapted to engage the face of the supporting wall, an electric appliance including a base fixed within the conduit box, a cap carried by the fixture, terminals carried respectively by the base and the cap, and spring conductors carried by one of the parts of the electrical appliance and connected to the terminals thereof and detachably engaging the terminals of the other of said parts, and means for clamping the fixture to the box, substantially as and for the purpose set forth.

8. The combination of a conduit outlet box having means for connection with an electric conduit, and an opening in one side thereof, a fixture including a base for closing said opening, an electrical appliance including a base detachably fixed within the box, a cap detachably fixed to the face of the first-mentioned base opposed to the opening and separable from the base of the electrical appliance, terminals on the opposing faces of the base and cap of the electrical appliance and yielding means for detachably connecting the terminals when the first-mentioned base is in its normal position closing said opening, said means being fixed to the terminals on one of said opposing faces and detachably engaging the terminals on the other of said opposing faces, and means for detachably clamping the fixture to the box, substantially as and for the purpose described.

9. The combination of a conduit outlet box having means for connection with an electric conduit, and a non-circular opening in one side thereof, said box being formed with a projecting flange inclosing the opening, a fixture including a base coacting with the flange for closing said opening, the base having a non-circular projection, opposite sides of which engage opposite sides of the opening, an electrical appliance including a base detachably fixed within the box, a cap detachably fixed to the first-mentioned base and separable from the base of the electrical appliance, terminals on the opposing faces of the base and the cap of the electrical appliance and yielding means for detachably connecting the terminals when the first-mentioned base is in its normal position closing said opening, and screws for detachably clamping the fixture to the box, substantially as and for the purpose specified.

10. The combination with a wall having an opening therein, of a conduit outlet box on the inner side of the wall having means for connection with an electric conduit and an opening in one side thereof for registering with the opening in the wall, a fixture on the outer side of the wall including a base serving as a closure for the openings, an electrical appliance including a base detachably fixed within the box, a cap detachably fixed to the first-mentioned base and separable from the base of the electrical appliance, terminals on the opposing faces of the base and cap of the electrical appliance and yielding means for detachably connecting the terminals when the first-mentioned base is in its normal position closing said openings, said means being fixed to the terminals on one of said opposing faces, and means for detachably clamping the fixture to the box, substantially as and for the purpose set forth.

11. The combination with a wall having an opening therein, of a conduit outlet box on the inner side of the wall and having means for connection with an electric conduit and an opening in one side thereof for registering with the opening in the wall, the box having a flange projecting within the first-mentioned opening and surrounding the second-mentioned opening, the edge of the flange being arranged between the two ends of the first-mentioned opening, a fixture on the outer side of the wall including a base serving as a closure for the openings, said last-mentioned base having two surfaces, one above the other, respectively engaging the surface of the wall around the first-mentioned opening and the edge of the flange around the second-mentioned opening, an electrical appliance including a base detachably fixed within the box, a cap detachably fixed to the first-mentioned base, and separable from the base of the electrical appliance, terminals on the opposing faces of the base and cap of the electrical appliance and means for detachably connecting the terminals when the first-mentioned base is in its normal position closing said openings, and means for detachably clamping the fixture to the box, substantially as and for the purpose described.

In testimony whereof, I have hereunto signed my name in the presence of two attesting witnesses, at Syracuse, in the county of Onondaga, in the State of New York, this 28th day of July 1911.

ELDA G. SMITH.

Witnesses:
C. C. SCHOENECK,
J. E. PARKER.